US010192134B2

United States Patent
Liang et al.

(10) Patent No.: US 10,192,134 B2
(45) Date of Patent: Jan. 29, 2019

(54) COLOR IDENTIFICATION USING INFRARED IMAGING

(71) Applicant: Microsoft Technology Licensing, LLC, Redmond, WA (US)

(72) Inventors: Lin Liang, Redmond, WA (US); Christian F. Huitema, Clyde Hill, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 807 days.

(21) Appl. No.: 14/616,514

(22) Filed: Feb. 6, 2015

(65) Prior Publication Data

US 2015/0379369 A1    Dec. 31, 2015

Related U.S. Application Data

(60) Provisional application No. 62/019,351, filed on Jun. 30, 2014.

(51) Int. Cl.
*H04N 7/18*    (2006.01)
*G06K 9/46*    (2006.01)
(Continued)

(52) U.S. Cl.
CPC ....... *G06K 9/4652* (2013.01); *G06K 9/00362* (2013.01); *G06K 9/2018* (2013.01);
(Continued)

(58) Field of Classification Search
None
See application file for complete search history.

(56) References Cited

U.S. PATENT DOCUMENTS 6,845,181 B2    1/2005 Dupin et al.
7,953,251 B1    5/2011 Steinberg et al.
(Continued)

OTHER PUBLICATIONS

Hashimoto, N. et al., "Multispectral Image Enhancement for Effective Visualization", Optics Express, vol. 19, Issue 10, Retrieved at http://www.researchgate.net/profile/Kuniaki_Uto/publication/51193415_Multisperal_image_enhancement_for_effective_visualization/links/53f007fd0cf23733e812da82.pdf?inViewer=true&disableCoverPage=true&origin=publication_detailct, May 9, 2011, 15 pages.

(Continued)

*Primary Examiner* — Dakshesh D Parikh
(74) *Attorney, Agent, or Firm* — Alleman Hall Creasman & Tuttle LLP

(57) ABSTRACT

Embodiments are disclosed that relate to color identification. In one example, an image processing method comprises receiving an infrared (IR) image including a plurality of IR pixels, each IR pixel specifying one or more IR parameters of that IR pixel, identifying, in the IR image, IR-skin pixels that image human skin, identifying a skin tone of identified human skin based at least in part on the IR-skin pixels, the skin tone having one or more expected visible light (VL) parameters, receiving a VL image including a plurality of VL pixels, each VL pixel specifying one or more VL parameters of that VL pixel, identifying, in the VL image, VL-skin pixels that image identified human skin, and adjusting the VL image to increase a correspondence between the one or more VL parameters of the VL-skin pixels and the one or more expected VL parameters of the identified skin tone.

17 Claims, 9 Drawing Sheets

(51) Int. Cl.
*H04N 5/33* (2006.01)
*G06K 9/00* (2006.01)
*H04N 5/243* (2006.01)
*H04N 5/225* (2006.01)
*G06K 9/52* (2006.01)
*G06K 9/20* (2006.01)
*G06T 11/00* (2006.01)
*H04N 9/64* (2006.01)

(52) U.S. Cl.
CPC ............... *G06K 9/52* (2013.01); *G06T 11/00* (2013.01); *H04N 5/2256* (2013.01); *H04N 5/243* (2013.01); *H04N 5/33* (2013.01); *H04N 9/64* (2013.01)

(56) References Cited

U.S. PATENT DOCUMENTS

| | | | |
|---|---|---|---|
| 8,031,961 | B2 | 10/2011 | Nachlieli et al. |
| 8,406,482 | B1 | 3/2013 | Chien et al. |
| 8,675,960 | B2 | 3/2014 | Reid et al. |
| 8,705,853 | B2 | 4/2014 | van der Merwe |
| 2005/0244057 | A1* | 11/2005 | Ikeda .................. A45D 44/005 382/181 |
| 2005/0244072 | A1* | 11/2005 | Imai ................... G06K 9/00664 382/254 |
| 2009/0003708 | A1 | 1/2009 | Steinberg et al. |
| 2009/0118600 | A1 | 5/2009 | Ortiz et al. |
| 2010/0309336 | A1 | 12/2010 | Brunner et al. |
| 2012/0147194 | A1* | 6/2012 | Wang ..................... H04N 5/33 348/164 |
| 2012/0224019 | A1* | 9/2012 | Samadani ............. H04N 7/142 348/14.01 |
| 2012/0262577 | A1* | 10/2012 | Wang ................ G06K 9/00369 348/148 |
| 2012/0263357 | A1* | 10/2012 | Xu ..................... G06K 9/00013 382/128 |
| 2012/0309520 | A1* | 12/2012 | Evertt .................... G06T 19/20 463/31 |
| 2013/0113956 | A1 | 5/2013 | Anderson et al. |
| 2015/0049941 | A1* | 2/2015 | Hall ......................... G01J 3/36 382/165 |

OTHER PUBLICATIONS

Yuan, L. et al., "Automatic Exposure Correction of Consumer Photographs", In Proceedings of the 12th European Conference on Computer Vision (ECCV 2012), Part IV, Oct. 7, 2012, 15 pages.

ISA European Patent Office, International Search Report and Written Opinion Issued in Application No. PCT/US2015/038224, dated Oct. 12, 2015, WIPO, 12 pages.

Elgammal, et al., "Skin Detection—a Short Tutorial", Published on: Aug. 18, 2010 Available at: http://www.cs.rutgers.edu/~elgammal/pub/skin.pdf.

Süsstrunk, et al., "Automatic Skin Enhancement with Visible and Near-Infrared Image Fusion", In Proceedings of the international conference on Multimedia, Oct. 25, 2010, 4 pages.

Fredembach, et al., "Combining Visible and Near-Infrared Images for Realistic Skin Smoothing", In IS&T/SID 17th Color Imaging Conference, Nov. 11, 2009, 6 pages.

\* cited by examiner

COLOR IDENTIFICATION USING INFRARED IMAGING

CROSS REFERENCE TO RELATED APPLICATIONS

This application claims priority to U.S. Provisional Patent Application No. 62/019,351, filed Jun. 30, 2014, and entitled "COLOR IDENTIFICATION USING INFRARED IMAGING," the entirety of which is hereby incorporated herein by reference.

BACKGROUND

Various electronic imaging systems utilize a color image sensor to capture color images of a scene. Color perception, however, is a function of surrounding lighting conditions. An object imaged under one set of lighting conditions may be considered to have different colors than under a different set of lighting conditions. The identification of colors by such color imaging systems may thus be volatile.

SUMMARY

Embodiments are disclosed that relate to color identification in an image. In one example, an image processing method comprises receiving from an infrared camera a signal encoding an infrared (IR) image including a plurality of IR pixels, each IR pixel specifying one or more IR parameters of that IR pixel, identifying, in the IR image, IR-skin pixels that image human skin, identifying a skin tone of identified human skin based at least in part on the IR-skin pixels, the skin tone having one or more expected visible light (VL) parameters, receiving from a VL camera a signal encoding a VL image including a plurality of VL pixels, each VL pixel specifying one or more VL parameters of that VL pixel, identifying, in the VL image, VL-skin pixels that image identified human skin, and adjusting the VL image to increase a correspondence between the one or more VL parameters of the VL-skin pixels and the one or more expected VL parameters of the identified skin tone.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Digital color images can be greatly affected by the lighting present when the image is captured. In some instances, adverse lighting conditions can shift the resulting color of the image in undesirable ways. As discussed below, an infrared camera can be used to find portions of a digital image that include human skin, as well the skin's expected skin tone. With this knowledge, the color of the image can be shifted so that the skin color corresponds with the expected skin tone.

Figure 1A:
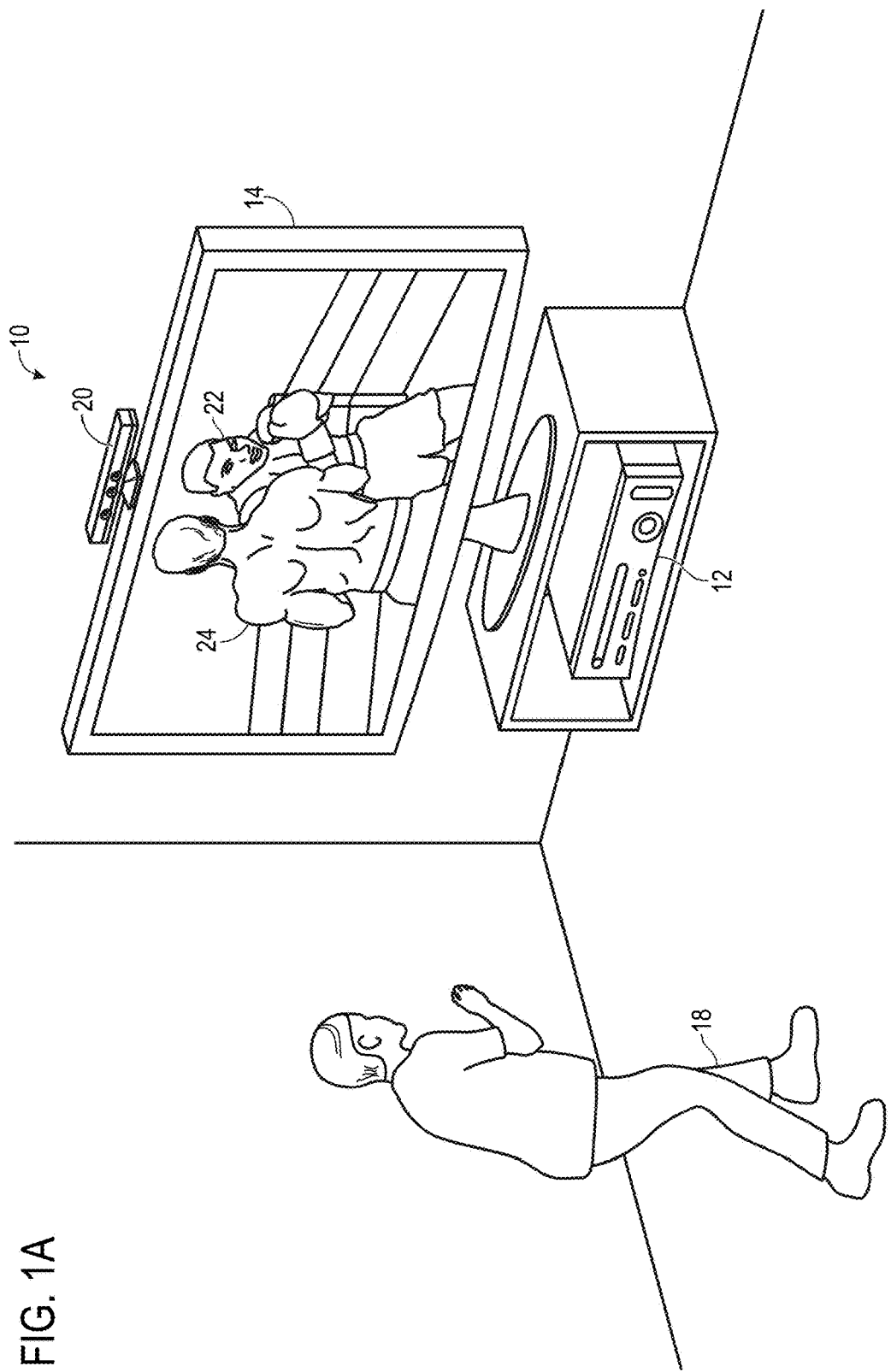
FIGS. 1A-1B shows a non-limiting example of a machine-vision system.

FIG. 1A shows a non-limiting example of a machine-vision system 10. In particular, FIG. 1A shows a computer gaming system 12 that may be used to play a variety of different games, play one or more different media types, and/or control or manipulate non-game applications. FIG. 1A also shows a display 14 that may be used to present game visuals to game players, such as game player 18. Furthermore, FIG. 1A shows a tracking device 20, which may be used to visually monitor one or more game players, such as game player 18. The example machine-vision system 10 shown in FIG. 1A is non-limiting. A variety of different computing systems may utilize machine vision for a variety of different purposes without departing from the scope of this disclosure.

A machine-vision system may be used to recognize, analyze, and/or track one or more human subjects, such as game player 18 (also referred to as human subject 18). FIG. 1A shows a scenario in which tracking device 20 tracks game player 18 so that the movements of game player 18 may be interpreted by gaming system 12. In particular, the movements of game player 18 are interpreted as controls that can be used to affect the game being executed by gaming system 12. In other words, game player 18 may use his movements to control the game. The movements of game player 18 may be interpreted as virtually any type of game control.

The example scenario illustrated in FIG. 1A shows game player 18 playing a boxing game that is being executed by gaming system 12. The gaming system uses display 14 to visually present a boxing opponent 22 to game player 18. Furthermore, the gaming system uses display 14 to visually present a player avatar 24 which gaming player 18 controls with his movements.

Figure 1B:
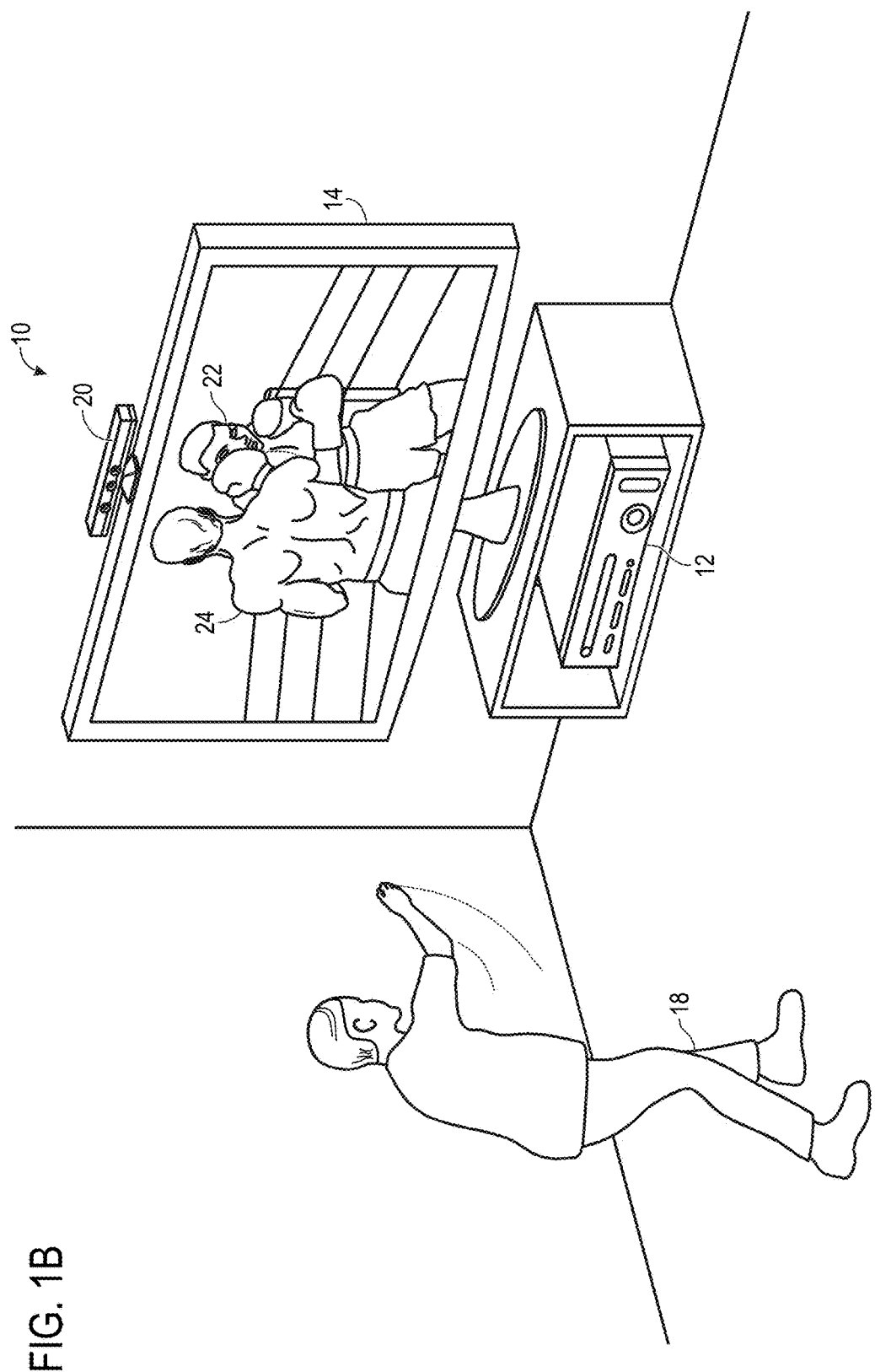

As shown in FIG. 1B, game player 18 can throw a punch in physical space as an instruction for player avatar 24 to throw a punch in the virtual space of the game. Gaming system 12 and/or tracking device 20 can be used to recognize and analyze the punch of game player 18 in physical space so that the punch can be interpreted as a game control that causes player avatar 24 to throw a punch in virtual space. For example, FIG. 1B shows display 14 visually presenting player avatar 24 throwing a punch that strikes boxing opponent 22 responsive to game player 18 throwing a punch in physical space. It will be appreciated, however, that other movements by game player 18 may be interpreted as other controls, and that some movements may be interpreted as controls that serve purposes other than controlling avatar 24.

Attributes of game player 18 can be analyzed by machine-vision system 10 so that player avatar 24 can be rendered to resemble aspects of game player 18. For example, machine-vision system 10 may be used to determine the color(s)

associated with the hair, clothing, and/or skin of game player 18 so that player avatar 24 shares one or more of these attributes of the game player. To perform color determination, tracking device 20 may utilize an infrared (IR) camera to image game player 18. IR light reflected by the skin of human subject 18 and captured by the IR camera may be used to determine a skin tone of the human subject that would be expected if a visible light (VL) camera images the human subject. This expected skin tone may be compared to an actual skin tone of human subject 18 captured by a VL camera and used to adjust VL images to increase the correspondence between the expected and actual skin tones. Color may be more accurately determined with an IR camera than with a VL camera alone, as ambient lighting conditions typically affect visible wavelengths more than infrared wavelengths.

Objects other than a human may be modeled and/or tracked. Such objects may be modeled and tracked independently of human subjects. An object held by a game player also may be modeled and tracked such that the motions of the player and the object are cooperatively analyzed to adjust and/or control parameters of a game. For example, the motion of a player holding a racket and/or the motion of the racket itself may be tracked and utilized for controlling an on-screen racket in a sports game. Attributes of such objects can be analyzed by machine-vision system 10 so that corresponding virtual objects can be rendered to resemble aspects of imaged real-world objects. As one example, an on-screen racket can be rendered with the same color and/or size as a real racket held by game player 18.

Machine-vision systems may be used to interpret human movements as operating system and/or application controls that are outside the realm of gaming. Virtually any controllable aspect of an operating system, application, or other computing product may be controlled by movements of a human. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
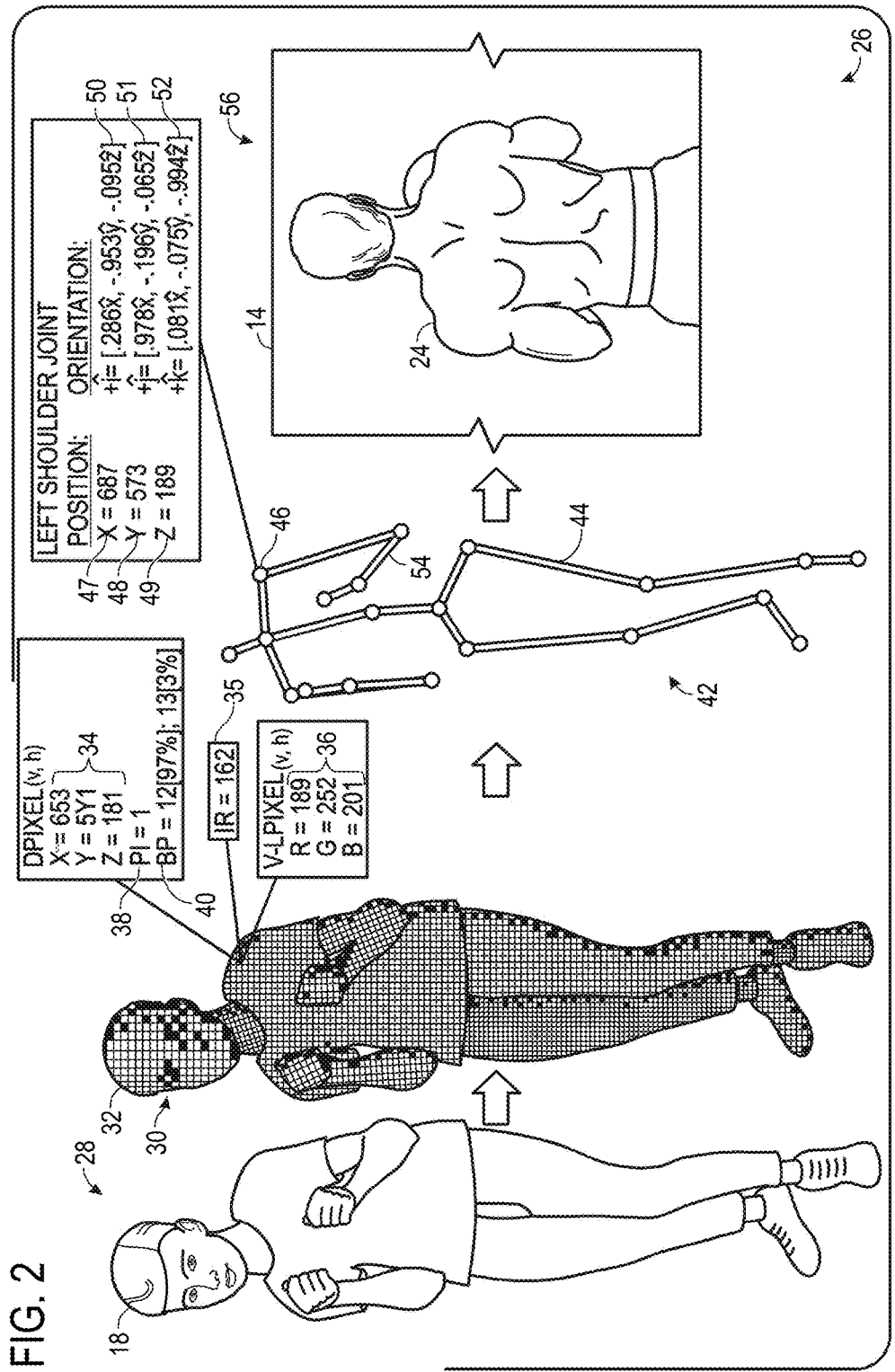
FIG. 2 graphically shows a simplified skeletal tracking pipeline of a machine-vision system.

FIG. 2 graphically shows a simplified skeletal tracking pipeline 26 of a machine-vision system. For simplicity of explanation, skeletal tracking pipeline 26 is described with reference to machine-vision system 10 of FIGS. 1A and 1B. However, skeletal tracking pipeline 26 may be implemented on any suitable machine-vision system without departing from the scope of this disclosure. For example, skeletal tracking pipeline 26 may be implemented on machine-vision system 700 of FIG. 7. Furthermore, skeletal tracking pipelines that differ from skeletal tracking pipeline 26 may be used without departing from the scope of this disclosure. Further still, IR-based color correction can be used independently of any skeletal modeling.

At 28, FIG. 2 shows game player 18 from the perspective of tracking device 20. A tracking device, such as tracking device 20, may include one or more sensors that are configured to observe a human subject, such as game player 18.

At 30, FIG. 2 shows a schematic representation 32 of the observation data collected by a tracking device, such as tracking device 20. The types of observation data collected will vary depending on the number and types of sensors included in the tracking device. In the illustrated example, the tracking device includes a visible light (VL) camera (e.g., color camera) and an infrared (IR) camera that includes an IR light source.

The IR camera optionally may be a three-dimensional depth camera such as a time-of-flight (TOF), stereo, or structured light depth camera operable to generate three-dimensional depth images, while in other implementations the infrared camera may be a two-dimensional IR camera operable to generate two-dimensional IR images. In some implementations, a two-dimensional IR camera may be used to infer depth from knowledge of IR reflection phenomena to estimate three-dimensional depth. Whether an IR camera is a three-dimensional depth camera or a two-dimensional IR camera, the IR camera may be configured to output a signal encoding an IR image to a suitable IR camera interface, which may be configured to receive the signal encoding the IR image from the IR camera. Example IR cameras are described below with reference to FIGS. 7 and 8. In other examples, the tracking device may further include other components, such as a microphone to enable the reception and analysis of directional and/or nondirectional sounds coming from an observed human subject and/or other sources.

An IR camera may determine, for each pixel of the IR camera, an intensity of IR light reflected by a surface in an observed scene. The IR intensity of each pixel may then be used to determine a depth for that pixel such that a depth value may be determined for each pixel of the IR camera. FIG. 2 schematically shows an example IR intensity 35 for a pixel of the IR camera. In some examples, an IR map may be formed comprising a plurality of IR pixels each having an associated IR value. In this way, the so-called "IR response" of a subject to impinging IR light may be assessed. Alternatively or additionally, IR values may be associated with depth values such that a depth map may include a plurality of pixels each having an associated IR value and depth value.

"Depth" is defined as a coordinate parallel to an optical axis of the IR camera, which increases with increasing distance from the IR camera. FIG. 2 schematically shows the three-dimensional x/y/z coordinates 34 observed for a DPixel[v,h] of an IR camera of tracking device 20. Similar three-dimensional x/y/z coordinates may be recorded for every pixel of the IR camera. The three-dimensional x/y/z coordinates for all of the pixels collectively constitute a depth map. As used herein, the term "depth map" refers to an array of pixels registered to corresponding regions of an imaged scene, with a depth value of each pixel indicating the depth of the corresponding region. The three-dimensional x/y/z coordinates may be determined in any suitable manner without departing from the scope of this disclosure.

A VL camera may determine, for each pixel of the VL camera, the relative light intensity of a surface in the observed scene for one or more light channels (e.g., red, green, blue, grayscale, etc.). FIG. 2 schematically shows the red/green/blue color values 36 observed for a V-LPixel[v,h] of a VL camera of tracking device 20. Similar red/green/blue color values may be recorded for every pixel of the VL camera. The red/green/blue color values for all of the pixels collectively constitute a digital color image. The red/green/blue color values may be determined in any suitable manner without departing from the scope of this disclosure. A VL camera may be configured to output a signal encoding a VL image to a suitable VL camera interface, which may be configured to receive the signal encoding the VL image from the VL camera. Example color imaging technologies are discussed in more detail with reference to FIG. 7.

The IR camera and VL camera may have the same resolutions, although this is not required. Whether the cameras have the same or different resolutions, the pixels of the VL camera may be registered to the pixels of the IR camera. In this way, both color and depth information may be determined for each portion of an observed scene by considering the registered pixels from the visible light camera and the IR camera (e.g., V-LPixel[v,h] and DPixel[v,h]). As described in further detail below, colors in the observed scene may be identified based on both color values observed by the VL camera and infrared values observed by the IR camera.

Figure 3:
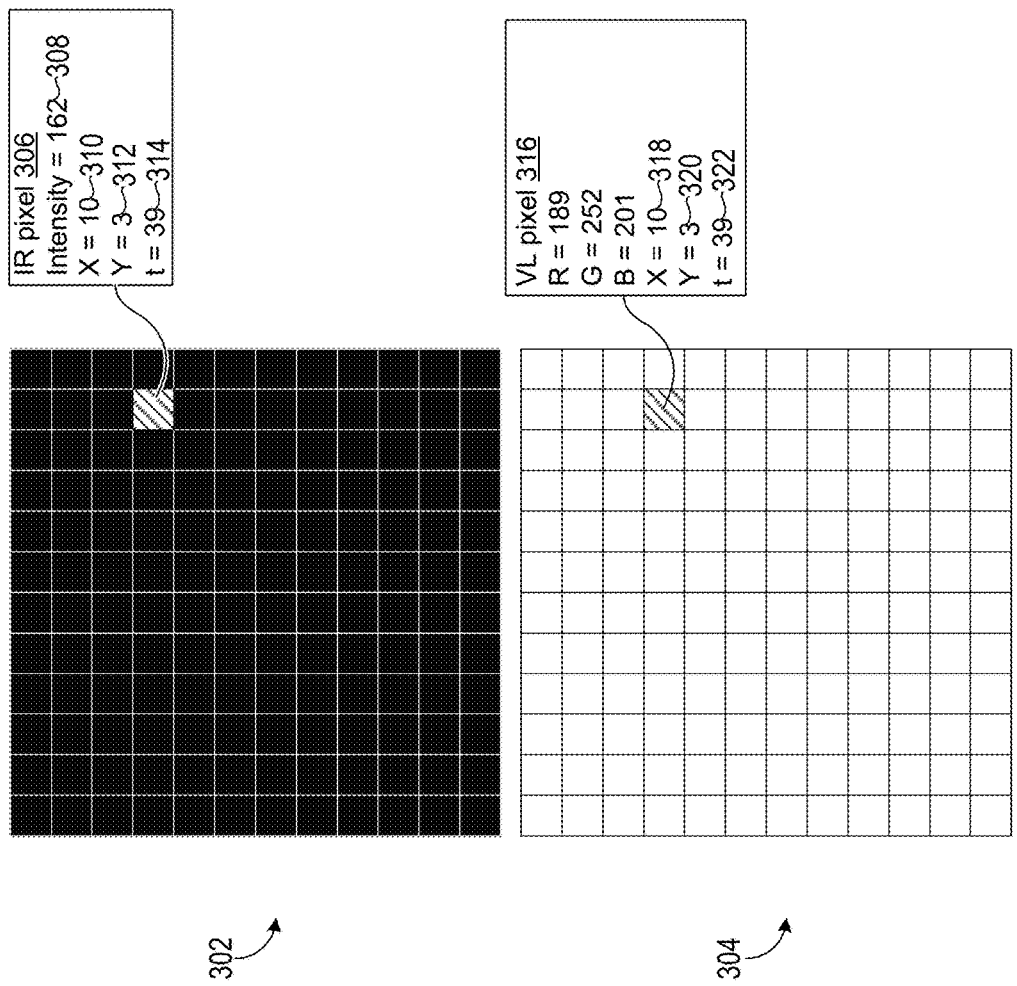
FIG. 3 shows an example of pixel registration between an IR image and a VL image.

Turning now to FIG. 3, an example of pixel registration between an IR image 302 and a VL image 304 is shown. IR image 302 includes a plurality of IR pixels (e.g., IR pixel 306). Each IR pixel specifies one or more IR parameters of that IR pixel. In the example depicted in FIG. 3, IR pixel 306 specifies an IR intensity 308 of that pixel, which may represent the IR response of a surface imaged by that pixel to impinging IR light. IR pixel 306 may specify additional IR parameters, including but not limited to an x-coordinate 310 and a y-coordinate 312, which cooperate to identify the spatial location of the IR pixel in IR image 302, and/or a temporal identifier 314 that identifies the temporal location of the IR pixel.

VL image 304 similarly includes a plurality of VL pixels (e.g., VL pixel 316). Each VL pixel specifies one or more VL parameters of that VL pixel. As shown in FIG. 3, VL pixel 316 specifies respective brightnesses for R, G, and B channels. VL pixel 316 also specifies an x-coordinate 318, a y-coordinate 320, and a temporal identifier 322, which are analogous to their respective counterparts specified by IR pixel 306.

A comparison of the IR parameters specified by IR pixel 306 to the VL parameters specified by VL pixel 316 may enable the temporal and/or spatial registration of IR pixel 306 to VL pixel 316. For example, temporal registration of IR pixel 306 to VL pixel 316 may include matching temporal identifier 314 to temporal identifier 322, which in some examples may be timestamps. In another example, temporal identifiers 314 and 322 may respectively specify a relative order or position of IR image 302 (and thus IR pixel 306) and VL image 304 (and thus VL pixel 316) in respective sequences of IR and VL images. For implementations in which sequences of IR and VL images are captured, each corresponding pair of IR and VL images, and their constituent pixels, may be time-registered to each other.

Spatial registration of IR pixel 306 to VL pixel 316 may similarly include matching x-coordinate 310 and y-coordinate 312 of the IR pixel to x-coordinate 318 and y-coordinate 320 of the VL pixel, respectively. In some examples, the IR camera and VL camera used to respectively capture IR image 302 and VL image 304 may be physically spaced apart from each other and/or may have a different vantage point, which can result in parallax or spatial misalignment between the IR and VL images, even when time-registered to each other. In this case, an initial spatial registration of IR pixel 306 to VL pixel 316 may be inferred based on the vantage points of the IR and VL camera and an assumed distance of a surface imaged by the cameras. Alternatively or additionally, spatial registration of IR pixel 306 to VL pixel 316 may include applying a spatial transform to IR image 302 so that the IR image aligns more closely with VL image 304. When handling a sequence of images, a consistent spatial transform may be applied to each IR image and/or VL image based on known vantage points and assumed imaging distances. Alternatively, spatial transforms may be dynamically adjusted based on one or more distance-estimating inputs (e.g., an assessment of distance based on one or more previous images). In either case, each IR image in a sequence of IR images may be spatially registered to a corresponding VL image in a sequence of VL images.

By registering pixels of IR image 302 to pixels of VL image 304 in this way, infrared and visible light information may be obtained for at least one common surface captured in the images. As described in further detail below, cooperative use of infrared and visible light information may enable a more accurate measurement of color than would be provided by visible light information alone.

Returning to FIG. 2, in some implementations surface normal vectors may be determined for each pixel in a depth map and/or color image such that a respective surface normal is associated with every pixel in the depth map and/or color image. Further, a "lighting direction"—that is, the direction in which a subject is illuminated by light (e.g., IR light) from the tracking device—may be determined for each pixel in a depth map and/or color image.

The collected data may take the form of virtually any suitable data structure(s), including but not limited to one or more matrices that include a three-dimensional x/y/z coordinate for every pixel imaged by the IR camera and the VL camera, red/green/blue color values for every pixel imaged by the VL camera, and/or infrared values for every pixel imaged by the IR camera. While FIG. 2 depicts a single frame, it is to be understood that a human subject may be continuously observed and modeled at a suitable rate (e.g., 30 frames per second). Accordingly, data may be collected for each such observed frame. Repeated imaging may be used to assemble a time-resolved series of images—i.e., IR video, color video, and/or depth video. The collected data may be made available via one or more Application Programming Interfaces (APIs) and/or further analyzed as described below.

A tracking device and/or cooperating computing system optionally may analyze a depth map to distinguish human subjects and/or other targets that are to be tracked from non-target elements in the observed depth map. Each pixel of the depth map may be assigned a player index 38 that identifies that pixel as imaging a particular target or non-target element. As an example, pixels corresponding to a first player can be assigned a player index equal to one, pixels corresponding to a second player can be assigned a player index equal to two, and pixels that do not correspond to a target player can be assigned a player index equal to zero. Such player indices may be determined, assigned, and saved in any suitable manner without departing from the scope of this disclosure. In a particular embodiment, pixels that belong to a human subject may be identified by sectioning off a portion of the depth data that exhibits above-threshold motion over a suitable time scale, and attempting to fit that section to a generalized geometric model of a human being. If a suitable fit can be achieved, then the pixels in that section are recognized as those of a human subject.

A tracking device and/or cooperating computing system optionally may further analyze the pixels of a depth map of a human subject in order to determine what part of that subject's body each such pixel is likely to image. A variety of different body-part assignment techniques can be used to assess which part of a human subject's body a particular pixel is likely to image. Each pixel of the depth map with an appropriate player index may be assigned a body part index 40. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

As one non-limiting example, machine-learning can be used to assign each pixel a body part index and/or body part probability distribution. The machine-learning approach analyzes a human subject using information learned from a prior-trained collection of known poses. In other words, during a supervised training phase, a variety of different people are observed in a variety of different poses, and human trainers provide ground truth annotations labeling different machine-learning classifiers in the observed data. The observed data and annotations are used to generate one or more machine-learning algorithms that map inputs (e.g., observation data from a tracking device) to desired outputs (e.g., body part indices for relevant pixels).

Furthermore, machine-learning may be used to identify pixels that correspond to the skin of a human subject. Such pixels may be classified as "skin pixels" and distinguished from non-skin pixels, which may correspond to clothing or portions of a background scene, for example. Similarly, machine-learning may be used to identify pixels that correspond to other regions of a human subject, such as hair.

Figure 4:
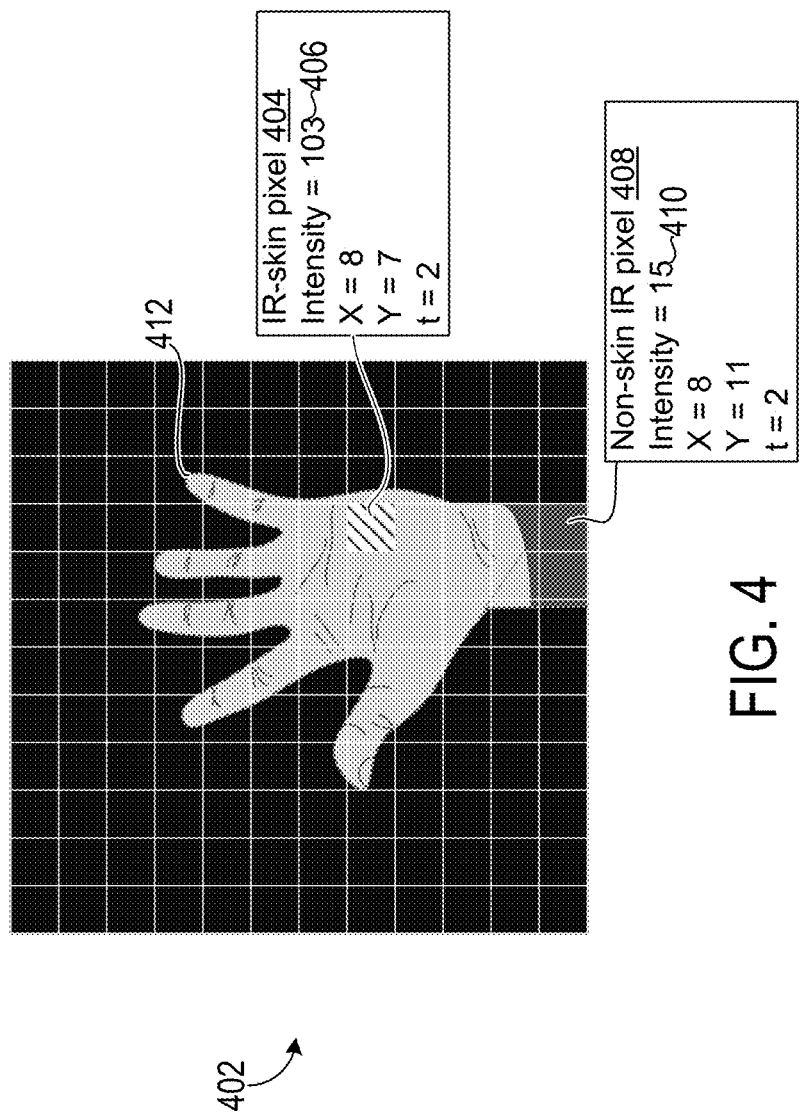
FIG. 4 illustrates the identification of skin pixels in an IR image.

FIG. 4 schematically illustrates the identification of skin pixels in an IR image. As shown therein, an IR image 402 images a hand of a human subject, and as such includes at least one IR-skin pixel—that is, an IR pixel that images human skin. IR-skin pixel 404 is one example of an IR pixel that images human skin, and may be identified as such—and distinguished from non-skin IR pixels—based on the one or more IR parameters specified by the IR-skin pixel. In particular, IR-skin pixel 404 specifies an IR intensity 406 that falls within a predetermined range of IR intensities known to correspond to human skin. The predetermined range of IR intensities corresponding to human skin may be determined via a trained machine learning algorithm. Training of the machine learning algorithm may include capturing IR images of human subjects and recording the IR intensities of IR-skin pixels that image skin of the human subjects at known distances. The IR-skin pixels may be identified, and distinguished from non-skin IR pixels, via manual annotation and/or an automated process utilizing the body part recognition processes described herein, for example. A range of IR intensities that correspond to human skin may then be assembled and used to assess other IR intensities to identify IR-skin pixels. Alternatively or additionally, the predetermined range of IR intensities may be determined during capture of IR images, where facial recognition is used to identify pixels corresponding to the face of a human subject. The IR intensities of the pixels identified as corresponding to the face may then be used to assemble the range of IR intensities corresponding to human skin.

The predetermined range of IR intensities that correspond to human skin may be used to identify non-skin IR pixels—that is, IR pixels that do not image human skin. In the example depicted in FIG. 4, a non-skin IR pixel 408 is identified by comparing an IR intensity 410 of the non-skin IR pixel to the predetermined range of IR intensities. In this example, IR intensity 410 falls outside of the predetermined range of IR intensities, causing pixel 408 to be identified as a non-skin IR pixel. Non-skin IR pixel 408 may correspond to the clothing of the human subject imaged by IR image 402, for example.

IR intensities recorded in an IR image may be used for other purposes, alternatively or in addition to identifying IR-skin pixels. For example, a threshold IR intensity may be determined based on one or more of the IR intensities recorded in the IR image, where the threshold IR intensity is used to distinguish background IR pixels from foreground IR pixels. Analysis of the foreground IR pixels may be prioritized over that of the background IR pixels, as the foreground pixels are considered more likely to image surfaces of interest—e.g., those of a human subject.

Other techniques may be employed alternatively or in addition to those described above for identifying IR-skin pixels in an IR image. For example, the IR image may be analyzed for geometric features that correspond to human body shapes. Continuing with FIG. 4, IR image 402 may be analyzed for geometric features that correspond to the hand of the human subject imaged therein. Geometric analysis may include edge detection, in which boundaries separating regions of significantly different IR intensity are identified. In IR image 402, edge detection identifies a boundary 412 that separates a region of IR intensities that correspond to human skin (e.g., of the hand) from a region of IR intensities that do not correspond to human skin (e.g., background pixels, pixels corresponding to clothing). Edge detection may thus enable at least gross detection of human body shapes. Geometric analysis may alternatively or additionally include shape recognition, in which contiguous or near-contiguous regions of similar IR intensity are identified. Various suitable ranges of IR intensity may be considered similar; in some examples, a range may be selected so that IR intensities that differ due to varying depth yet belong to the same shape are considered similar. It will be appreciated that geometric analysis may be performed on a VL image (e.g., VL image 304 of FIG. 3), alternatively or in addition to an IR image. Geometric analysis of a VL image may include identifying regions of similar color and/or regions of significantly differing color, for example. It will be appreciated that VL-skin pixels in a VL image—that is, VL pixels that image human skin—may be identified alternatively or in addition to identifying IR-skin pixels. For embodiments in which registered IR and VL images are captured, VL-skin pixels may be identified by selecting VL-skin pixels of a plurality of VL pixels in a VL image that are registered to identified IR-skin pixels.

The IR response of human skin may also be used to determine the skin tone of a human subject. The IR response of human skin varies as a function of skin tone—for example, different skin tones may exhibit significantly different IR intensities when subjected to a common source of IR light. Training of a skin tone classifier configured to classify the skin tone of a human subject may leverage this phenomenon by measuring the IR response of the skin of a variety of human subjects. The variety of human subjects may be selected to adequately represent the gamut of human skin tones. The measured IR responses may then be sorted into a plurality of subranges each corresponding to a different skin tone. The plurality of subranges may be subranges of the predetermined range of IR intensities corresponding to human skin, for example.

FIG. 4 illustrates the identification of skin tone based on IR response. In particular, the skin tone of human skin identified in IR image 402 may be identified based at least in part on IR-skin pixels identified in the IR image—e.g., IR-skin pixel 404, potentially in addition to other identified IR-skin pixels. As described above, IR-skin pixel 404 specifies one or more IR parameters including IR intensity 406, which in this example is within a corresponding one of a plurality of subranges within the predetermined range of IR intensities corresponding to human skin. In this way, skin tone may be identified based on the IR intensities of one or more IR-skin pixels being within a corresponding one of the plurality of subranges.

An identified skin tone may have one or more expected VL parameters—that is, if a VL image of skin having the identified skin tone were captured, the VL-skin pixels of the VL image that image the skin would be expected to specify one or more VL parameters corresponding to the one or more expected VL parameters. This correspondence may be expected under specified lighting conditions. As one example, the one or more expected VL parameters may include a color expected to be exhibited by one or more VL pixels imaging skin having the identified skin tone, under neutral lighting conditions (e.g., outdoor sunlight having a color temperature of 6500K). Identifying differences between the one or more expected VL parameters for the identified skin tone, and the one or more VL parameters specified by VL pixel(s) imaging skin having the identified skin tone, may enable an assessment of lighting conditions affecting capture of a VL image and optional adjustment of the VL image to increase the correspondence between the one or more expected VL parameters and the one or more specified VL parameters. In this way, measurement of the IR response of human skin may increase the accuracy of VL image generation and color identification therein.

Returning to FIG. 2, at 42, FIG. 2 shows a schematic representation of a virtual skeleton 44 that serves as a machine-readable representation of game player 18. Virtual skeleton 44 includes twenty virtual joints—{head, shoulder center, spine, hip center, right shoulder, right elbow, right wrist, right hand, left shoulder, left elbow, left wrist, left hand, right hip, right knee, right ankle, right foot, left hip, left knee, left ankle, and left foot}. This twenty joint virtual skeleton is provided as a non-limiting example. Virtual skeletons in accordance with the present disclosure may have virtually any number of joints.

The various skeletal joints may correspond to actual joints of a human subject, centroids of the human subject's body parts, terminal ends of a human subject's extremities, and/or points without a direct anatomical link to the human subject. Each joint has at least three degrees of freedom (e.g., world space x, y, z). As such, each joint of the virtual skeleton is defined with a three-dimensional position. For example, a left shoulder virtual joint 46 is defined with an x coordinate position 47, a y coordinate position 48, and a z coordinate position 49. The position of the joints may be defined relative to any suitable origin. As one example, a tracking device may serve as the origin, and all joint positions are defined relative to the tracking device. Joints may be defined with a three-dimensional position in any suitable manner without departing from the scope of this disclosure.

A variety of techniques may be used to determine the three-dimensional position of each joint. Skeletal fitting techniques may use depth information, infrared information, color information, body part information, and/or prior trained anatomical and kinetic information to deduce one or more skeleton(s) that closely model a human subject. As one non-limiting example, the above described body part indices may be used to find a three-dimensional position of each skeletal joint.

A joint orientation may be used to further define one or more of the virtual joints. Whereas joint positions may describe the position of joints and virtual bones that span between joints, joint orientations may describe the orientation of such joints and virtual bones at their respective positions. As an example, the orientation of a wrist joint may be used to describe if a hand located at a given position is facing up or down.

Joint orientations may be encoded, for example, in one or more normalized, three-dimensional orientation vector(s). The orientation vector(s) may provide the orientation of a joint relative to the tracking device or another reference (e.g., another joint). Furthermore, the orientation vector(s) may be defined in terms of a world space coordinate system or another suitable coordinate system (e.g., the coordinate system of another joint). Joint orientations also may be encoded via other means; as non-limiting examples, quaternions and/or Euler angles may be used to encode joint orientations.

FIG. 2 shows a non-limiting example in which left shoulder joint 46 is defined with orthonormal orientation vectors 50, 51, and 52. In other embodiments, a single orientation vector may be used to define a joint orientation. The orientation vector(s) may be calculated in any suitable manner without departing from the scope of this disclosure. As a non-limiting example, two orientation vectors (e.g., i and j) may be determined based on classified body parts and/or joints via depth information, and a third orientation vector (e.g., k) determined via a cross product of the first two orientation vectors. The third orientation vector may be used as a surface normal vector, for example.

Joint positions, orientations, and/or other information may be encoded in any suitable data structure(s). Furthermore, the position, orientation, and/or other parameters associated with any particular joint may be made available via one or more APIs.

Via any suitable minimization approach, the lengths of skeletal segments and the positions and rotational angles of joints in a virtual skeleton may be adjusted for agreement with the various contours of a depth map. This process may define the location and posture of an imaged human subject. Some skeletal-fitting algorithms may use the depth data in combination with other information, such as color-image data, infrared data, and/or kinetic data indicating how one locus of pixels moves with respect to another.

As seen in FIG. 2, virtual skeleton 44 may optionally include a plurality of virtual bones (e.g. a left forearm bone 54). The various skeletal bones may extend from one skeletal joint to another and may correspond to actual bones, limbs, or portions of bones and/or limbs of a human subject. The joint orientations discussed herein may be applied to these bones. For example, an elbow orientation may be used to define a forearm orientation.

At 56, FIG. 2 shows display 14 visually presenting avatar 24. Virtual skeleton 44 may be used to render avatar 24. Because virtual skeleton 44 changes poses as human subject 18 changes poses, avatar 24 accurately mimics the movements of human subject 18. Thus, in some embodiments, a virtual skeleton may be fit to each of a sequence of frames of depth video (e.g., successive depth maps). By analyzing positional change in the various skeletal joints and/or segments, the corresponding movements—e.g., gestures, actions, or behavior patterns—of an imaged human subject may be determined, which may facilitate the interpretation of natural user input (NUI), for example. It is to be understood, however, that a virtual skeleton may be used for additional and/or alternative purposes without departing from the scope of this disclosure.

In some examples, generation of an avatar (e.g., avatar 24) may include attempting to reproduce aspects of an imaged human subject that relate to color. For example, generation of the avatar may include identifying the skin tone(s), hair color(s), and/or clothing color(s) of the human subject. The identification of color in a scene may be desired for other purposes, however—e.g., as part of biometric identification of the human subject. Although colors in an imaged scene may be at least partially defined based on color values obtained by a VL camera in the manners described above, the general perception of color may be affected by surrounding lighting conditions. A color that appears white in relatively neutral lighting conditions (e.g., in outdoor sunlight having a color temperature of 6500K), for example, may appear color-shifted (e.g., toward blue colors) in indoor lighting conditions. Other factors can alter the perception of color. For example, the identification of skin tone and hair color of a human subject may vary as a light source backlighting the human subject changes. As such, the identification of color in a scene via a VL camera alone may be volatile, leading to degraded output (e.g., inaccurate avatar generation, biometric identification).

To reduce the volatility of color identification in a scene, the IR response of pixels corresponding to the skin of a human subject may be used in addition to VL data to identify color in the scene. The IR response of human skin varies less with changing VL conditions than the VL response of human skin to changing VL conditions. As such, measurement of the IR response of a human subject's skin may provide an indication of the surrounding lighting conditions. As described above, this IR response may be compared to IR responses associated with respective known skin tones to determine the skin tone of the human subject. With the skin tone of the human subject determined, color values corresponding to the human subject's skin may be compared with the determined skin tone to provide an indication of how the surrounding lighting conditions affect color identification. Differences between the human subject's skin color perceived in a VL image and their determined skin tone may be used to adjust aspects of the VL image, including color values that do and/or do not correspond to the human subject's skin. Color identification may then be performed based on the adjusted color values.

Figure 5:
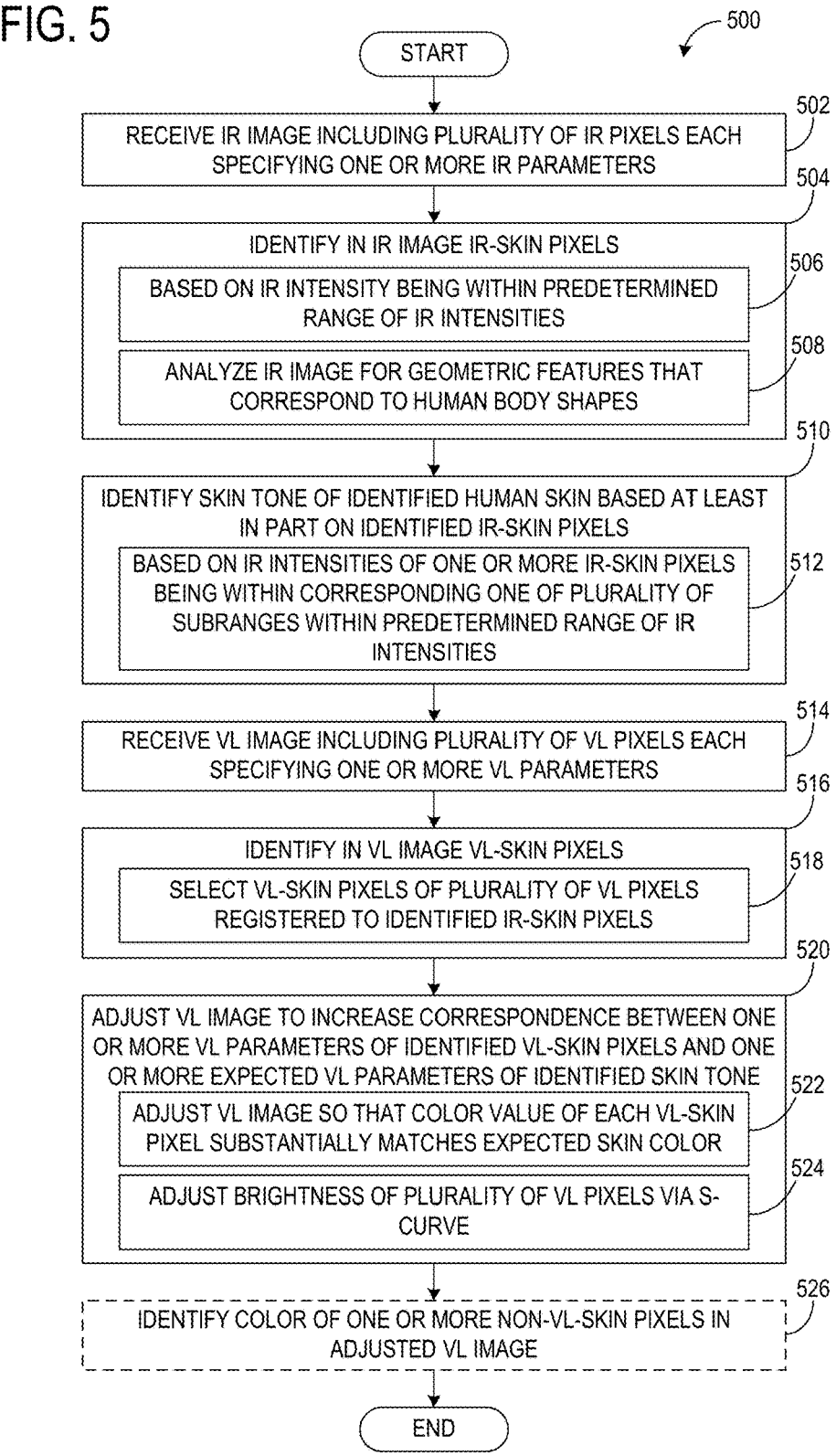
FIG. 5 shows a flowchart illustrating a method of identifying color in an image based on collected visible light and IR light.

Turning now to FIG. 5, a flowchart illustrating a method 500 of identifying color in an image based on collected visible light (VL) and infrared (IR) light is shown. Method 500 may be performed by an image-processing computer utilizing color data and IR data collected by tracking device 20, for example. The color and/or IR data may be encoded in a signal that is delivered to the image-processing computer via a hardware interface of the image-processing computer. A common hardware interface may be provided for both the color and IR data, while in other examples separate hardware interfaces may be provided for the color and the IR data, respectively. In some implementations, the color data (e.g., VL images) and the infrared data (e.g., IR images) may be obtained from a VL camera and an IR camera, respectively. The IR camera may be a three-dimensional depth camera such as camera 704 of FIG. 7, or may be a two-dimensional IR camera such as camera 800 of FIG. 8, for example.

At 502 of method 500, an IR image including a plurality of IR pixels is received, each IR pixel specifying one or more IR parameters of that IR pixel. The one or more IR parameters may include an IR intensity, for example. The IR image may be received from an IR camera via an IR camera interface configured to receive the IR image from the IR camera. The IR camera may output a signal encoding the IR image, for example.

At 504 of method 500, IR-skin pixels are identified in the IR image. Identifying IR-skin pixels may include, at 506, identifying each IR-skin pixel based on an intensity specified by that IR pixel being within a predetermined range of IR intensities known to correspond to human skin. As such, identifying IR-skin pixels in this manner may include feeding one or more IR pixels of the IR image to a trained IR pixel classifier that maps the predetermined range of IR intensities to IR-skin pixels, and IR intensities outside of the range to non-skin IR pixels. Alternatively or additionally, identifying IR-skin pixels may include, at 508, analyzing the IR image for geometric features that correspond to human body shapes. Geometric analysis may include edge detection and/or shape recognition, for example.

At 510 of method 500, a skin tone of identified human skin (e.g., identified via identification of the IR-skin pixels) is identified based at least in part on the identified IR-skin pixels. Identification of the skin tone may include, at 512, identifying the skin tone based on IR intensities of one or more IR-skin pixels being within a corresponding one of a plurality of subranges within the predetermined range of IR intensities. Skin tone identification may thus include feeding IR intensities of one or more IR-skin pixels to a trained skin tone classifier that maps each IR intensity subrange to a corresponding skin tone.

At 514 of method 500, a VL image including a plurality of VL pixels is received, each VL pixel specifying one or more VL parameters of that VL pixel. The one or more VL parameters may include an intensity (e.g., brightness) of one or more channels (e.g., R, G, B, greyscale), for example. The VL image may be received from a VL camera via a VL camera interface configured to receive the VL image from the VL camera. The VL camera may output a signal encoding the VL image, for example.

At 516 of method 500, VL-skin pixels are identified in the VL image. Identifying VL-skin pixels may include, at 518, selecting VL-skin pixels of a plurality of VL skin pixels of the VL image that are registered to identified IR-skin pixels. In this example, one or more IR pixels of the IR image may be registered (e.g., spatially and/or temporally) to corresponding VL pixels of the VL image prior to identifying the VL-skin pixels.

At 520 of method 500, the VL image is adjusted to increase a correspondence between the one or more VL parameters specified by the identified VL-skin pixels and one or more expected VL parameters of the identified skin tone. As described above, the identified skin tone may specify one or more expected VL parameters, such as a (e.g., visible) color expected to be specified by VL-skin pixels imaging skin having the identified skin tone, under specified lighting conditions (e.g., outdoor sunlight having a color temperature of 6500K). Adjusting the VL image may include, at, 522, adjusting the VL image so that the color value of each VL-skin pixel of the VL image substantially matches the expected skin color. It will be appreciated that such adjustment of the VL image may include adjusting a brightness of each VL-skin pixel (e.g., a per-channel brightness). In some examples, the identified skin tone may have a respective expected VL brightness for each of a red channel, a blue channel, and a green channel. In this case, the VL image may be adjusted to increase respective correspondences between the R, G, and B channel brightnesses of the VL-skin pixels and the expected R, G, and B channel brightnesses of the identified skin tone—e.g., to increase a correspondence between the VL-skin pixel red channel brightness and the expected red channel brightness, a correspondence between the VL-skin pixel green channel brightness and the expected green channel brightness, and a correspondence between the VL-skin pixel blue channel brightness and the expected blue channel brightness. Adjustment of a VL image in this way may enable compensation of adverse effects on visible light capture, such as underexposure and/or overexposure. The channels may be adjusted collectively as a group or individually. For example, the channels may be adjusted for white-balance or other color correction. Alternatively or additionally, adjusting the VL image may include, at 524, adjusting the brightness of the plurality of VL pixels of the VL image via an S-curve.

At 526 of method 500, the color of one or more non-VL-skin pixels in the adjusted VL image is optionally identified. In some examples, a brightness of one or more non-VL-skin pixels in the adjusted VL image may be identified for at least one channel (e.g., at least one of an R, G, and B channel). The one or more non-VL-skin pixels may image human hair, for example, or other regions of the human subject (e.g., clothing). In this way, color identification may be performed with increased accuracy and robustness, and with less volatility to ambient lighting conditions.

An example illustrating an implementation of method 500 follows. It will be appreciated, however, that this example is not intended to limit the scope of method 500, and that other approaches are possible without departing from the scope of this disclosure. In the example implementation, human subject skin tone may be classified based on IR skin response using a Lambertian model. In particular, the IR response of each IR-skin pixel in an IR image may be normalized based on the Lambertian model according to the following relation: $\check{R}_i = R_i * (d_i^2/(N_i \cdot L_i))$, where $\check{R}_i$ is the measured IR response, $d_i$ is the distance from the skin point to the view point (e.g., depth of the human subject at that pixel), $N_i$ is the surface normal vector at the skin point, and $L_i$ is the lighting direction vector at the skin point, with $(N_i \cdot L_i)$ being the dot product of these two vectors. $N_i$ and $L_i$ may be determined based on the depth map and the positions of the camera(s) and IR source(s) relative to the pixel of interest.

Next, a confidence value may be computed for each VL-skin pixel in the VL image according to the following relation: skin confidence=(distance >30.0)?0:(30.0−distance)/(2.0f*30.0). Distance may be computed according the following relation: distance=max(95.0f−R, max(40.0f−G, max(20.0f−B, max(15.0f−(max(R, max(G, B))−min(R, min (G, B))), max(15.0f−(R−G), B−R))))), where R, G, and B are the respective R, G, and B color values of a VL-skin pixel.

Next, the mean and mode of the IR values weighted by the skin confidence values may be determined. The IR mode may be found by a kernel density fitting, for example.

Next, the maximum value of the mean and IR mode may be used as a feature to find the closest skin tone subrange. The IR center value of each skin tone subrange may be learned from training data described above by a suitable brute force search algorithm, for example.

Next, the brightness level of the VL image may be adjusted based on the classified skin tone. The adjustment may be performed by an S-curve parameterized by two parameters: shadow amount $\phi_s$ and highlight amount $\phi_h$. Specifically, a function of the following form may be used: $f(x)=x+\phi_s*f_\Delta(x)-\phi_h*f_\Delta(1-x)$, where x and f(x) are the input and output pixel intensities. $f_\Delta(x)$ is the incremental function and is empirically defined as $f_\Delta(x)=k_1*x*\exp(k_2*x^{(k_3)})$. As non-limiting examples, $k_1$, $k_2$, and $k_3$ may assume the values 5, 14, and 1.6, respectively.

A human subject's face is often captured at underexposure conditions due to backlighting. To address these conditions, the highlight amount $\phi_h$ may be set to zero, with the shadow amount $\phi_s$ computed based on the classified skin tone. For a VL image specifying RGB color values, the VL image may be converted to YIQ space. The average intensity Y of the face skin region may then be computed. Supposing the intensity level of the classified skin tone is Y* and the number of skin pixels is N, the shadow amount $\phi_s$ is: $\phi_s=(Y^*-Y) \times N \times \Sigma f_\Delta(x)$. The intensity Y channel of the original image may be adjusted by the S-curve using the estimated shadow amount. The I and Q channels may be scaled by the adjustment of the Y channel.

The hair color of the human subject may be computed from the adjusted VL image. After the brightness of the VL image is adjusted based on the identified skin tone, a mixture Gaussian model may be fitted to the hair pixel's color to compute the hair color modes. The final hair color may be set as either the maximum color mode or the average of the first two color modes depending on the modes' weights.

As introduced above, such skin tone and hair analysis may be used to more accurately render an avatar. However, the above described color analysis is not limited to this application. Method 500 may be used to more accurately assess the neutral color perception of virtually any locus (e.g., hair, clothes, objects, environment, etc.) for any purpose.

While method 500 is described with reference to pixels of an image, it will be appreciated that the method may be performed for other image elements such as voxels without departing from the scope of this disclosure. Moreover, two or more skin tones and/or hair colors may be identified and/or adjusted.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
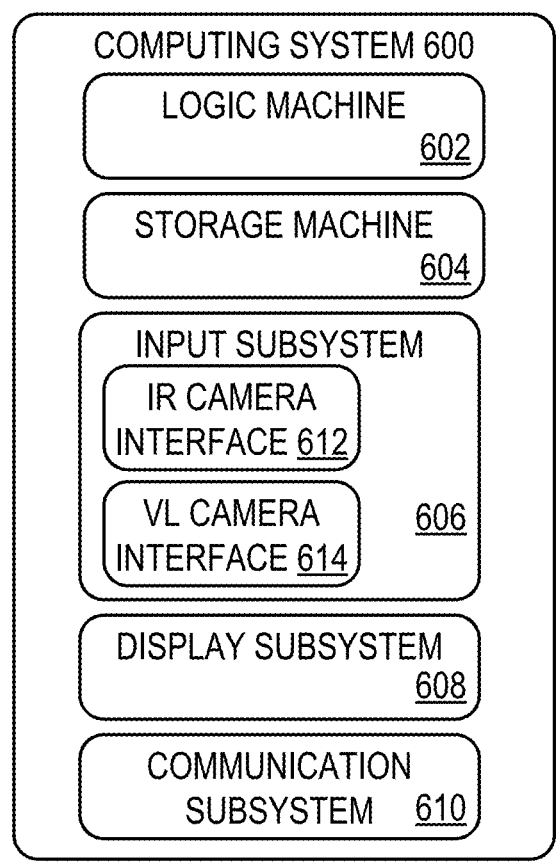
FIG. 6 schematically shows a non-limiting embodiment of a computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. Machine-vision system 10 of FIG. 1 is a non-limiting example of an implementation of computing system 600.

Computing system 600 includes a logic machine 602 and a storage machine 604. Computing system 600 may optionally include a display subsystem 608, input subsystem 606, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 608 may be used to present a visual representation of data held by storage machine 604. This visual representation may take the form of a graphical user interface (GUI). As the herein described methods and processes change the data held by the storage machine, and thus transform the state of the storage machine, the state of display subsystem 608 may likewise be transformed to visually represent changes in the underlying data. Display subsystem 608 may include one or more display devices utilizing virtually any type of technology. Such display devices may be combined with logic machine 602 and/or storage machine 604 in a shared enclosure, or such display devices may be peripheral display devices.

When included, input subsystem 606 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

In some examples, input subsystem 606 may include one or more hardware interfaces for receiving signals encoding images from one or more tracking devices. For example, input subsystem 606 may include an IR camera interface 612 configured to receive from an IR camera an IR image including a plurality of IR pixels. IR camera interface 612 may be configured to receive a signal from the IR camera encoding the IR image. Input subsystem 606 may alternatively or additionally include a VL camera interface 614 configured to receive from a LV camera a VL image including a plurality of VL pixels. VL camera interface 614 may be configured to receive a signal from the VL camera encoding the VL image. The IR and VL camera interfaces may incorporate various suitable interface technologies, including but not limited to wired and wireless interface technologies such as universal serial bus (USB), IEEE 1394, Bluetooth, Wi-Fi, etc.

Figure 7:
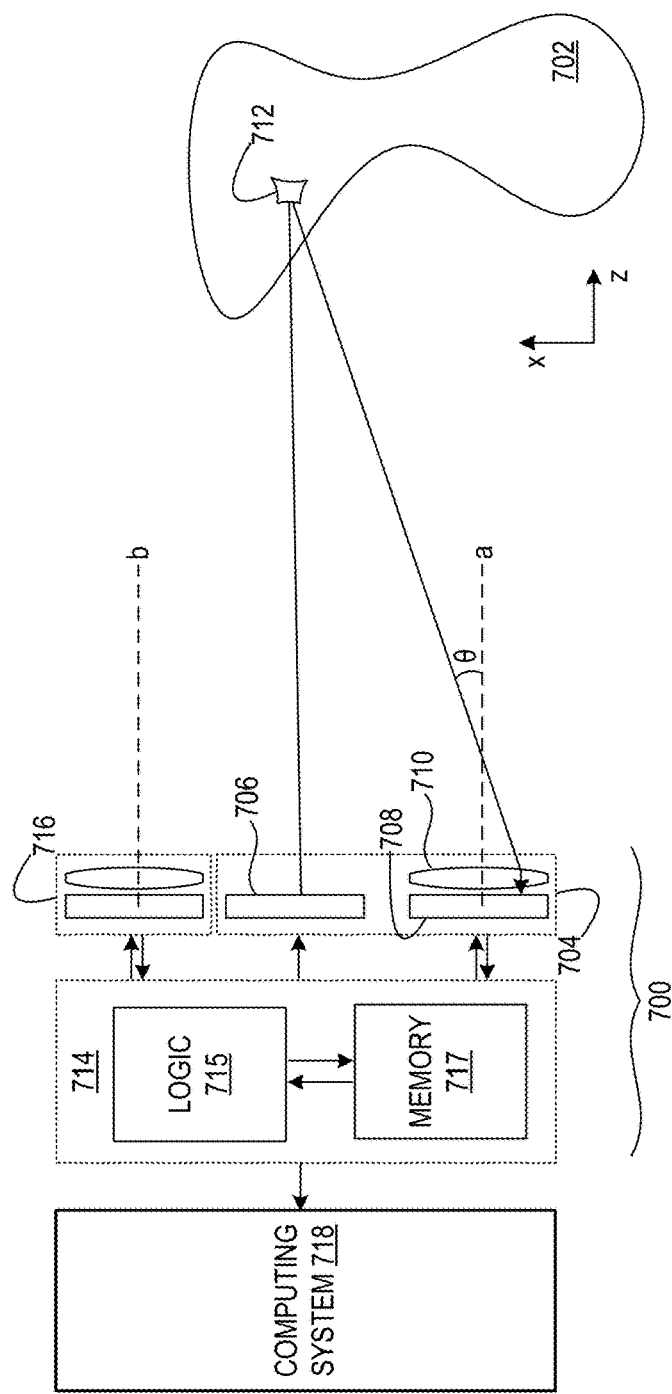
FIG. 7 shows aspects of an example machine-vision system.

FIG. 7 shows aspects of an example machine-vision system 700 configured to image a subject 702. In the illustrated embodiment, the machine-vision system includes a time-of-flight depth camera 704, which may be employed in tracking device 20 of FIG. 1, for example. In some configurations, the depth camera may be positioned from 0.1 to 5 meters away from the subject, though other depth ranges are contemplated as well. The machine-vision system disclosed herein is capable of imaging a broad range of subjects, from simple, static topologies to complex, moving subjects such as human beings. In some scenarios, an imaged subject may include both foreground and background portions and constitute an entire scene.

As shown in FIG. 7, depth camera 704 includes a modulated light source 706, an imaging pixel array 708, and an objective lens system 710. The depth camera may also include various other components, such as a wavelength filter (not shown in the drawings) which may be set in front of the imaging pixel array or the objective lens system.

Modulated light source 706 is configured to project onto subject 702 modulated probe light of an infrared (IR) or near-infrared (NIR) wavelength band. The objective lens system, accordingly, may be transparent in an IR or NIR band where the modulated light source emits. The probe light may be modulated temporally according to any suitable modulation waveform, including, but not limited to a pulsed or sinusoidal waveform. The nature of the modulated light source may differ in the various embodiments of this disclosure. In some embodiments, the modulated light source may include a modulated laser, such as an IR or NIR laser. More particular examples include an edge emitting laser or vertical-cavity surface-emitting laser (VCSEL). In other embodiments, the modulated light source may include one or more high-power light-emitting diodes (LEDs).

Objective lens system 710 is configured to receive the light reflected from subject 702 and refract such light onto imaging pixel array 708. In some embodiments, the objective lens system may provide a relatively high FOV. In the illustrated embodiment, the lens system and imaging pixel array share a common optical axis A, which is normal to the imaging pixel array and passes through a center of the lens system. The objective lens system may be a compound lens system in some embodiments. In more particular configurations, the objective lens system may include five or six refractive elements.

Imaging pixel array 708 includes an array of depth-sensing pixels, each configured to receive at least some of the modulated probe light reflected back from a corresponding locus 712 of subject 702. Each pixel of the array outputs information useable to determine the distance from depth camera 704 to the subject locus imaged onto that pixel. Each pixel may additionally or alternatively be useable to assess the IR reflectance of a locus imaged by that pixel. Alternatively, a separate IR camera (e.g., IR camera 800 of FIG. 8), that is not also used as a component of the depth camera, may be used to assess the IR reflectance of an imaged locus.

Controller 714 of machine-vision system 700 is operatively coupled to modulated light source 706 and to imaging pixel array 708, and is configured to compute the distance to locus 712. The controller includes logic 715 that provides synchronized, modulated drive signals to light source 706 and to imaging pixel array 708, to synchronize the operation of these components. In particular, the controller logic modulates emission from the light source while synchronously biasing the electrodes of the imaging pixel array. The controller is also configured to read the output from each pixel of the imaging pixel array to enable computation of a depth map of subject 702. Logic 715 may be communicatively coupled with memory 717 configured to hold instructions executable by the logic to implement the methods and processed described herein. As shown in FIG. 7, controller 714 may be communicatively coupled with a computing system 718 to enable the approaches described herein. Computing system 718 may be computing system 600 of FIG. 6, for example, and may include one or more hardware interfaces configured to receive signals encoding images—e.g., an IR camera interface such as IR camera interface 612 configured to receive a signal encoding an IR image from an IR camera, and/or a VL camera interface such as VL camera interface 614 configured to receive a signal encoding a VL image from a VL camera.

In the illustrated embodiment, machine-vision system 700 also includes a flat-image camera 716. Like depth camera 704, the flat-image camera also includes an imaging pixel array and a high-FOV objective lens system. In some embodiments, the lens system of the flat-image camera may have a fixed focal length. The flat-image camera may image visible light from subject 702 in a plurality of channels—e.g., red, green, blue, etc.—mapping the imaged color channels to its imaging pixel array. Alternatively, the flat-image camera may be a monochromatic camera, which images the subject in grayscale. Color or brightness values for all of the pixels exposed in the flat-image camera constitute collectively a 2D digital image. In some embodiments, depth and flat-image cameras of machine-vision system 700 may have the same resolutions. Even when the resolutions differ, the pixels of the flat-image camera may be registered to those of the depth camera. In this way, concurrent brightness and depth information may be assessed for each locus 712 of subject 702.

In the illustrated embodiment, flat-image camera 716 is aligned along an optical axis B, which is parallel to the optical axis A of depth camera 704. In another embodiment, a beam-splitting optic (not shown in the drawings) may be arranged optically upstream of the depth camera and the flat-image camera, and configured so that the depth camera and the flat-image camera receive light from subject 702 along the same optical axis. In these and other embodiments, any location (X', Y') in the FOV of one of the cameras may be related to a location (X", Y") in the FOV of the other camera via an appropriate coordinate transform, based on the geometric configuration of the machine-vision system. Accordingly, corresponding images from depth camera 704 and from flat-image camera 716 may be co-registered to each other.

In some embodiments, each imaging pixel array 708 of the depth camera 704 includes a first pixel element, an adjacent second pixel element, and may also include additional pixel elements. Each pixel element may include one or more finger gates, transfer gates and/or collection nodes epitaxially formed on a semiconductor substrate. The pixel elements of each pixel may be addressed so as to provide two or more integration periods synchronized to the emission from the modulated light source. The integration periods may differ in phase and/or total integration time. Based on the relative amount of differential (and in some embodiments common mode) charge accumulated on the pixel elements during the different integration periods, the distance out to a corresponding locus of the subject may be assessed. In some embodiments, modulated light source 706 and the first pixel element are energized concurrently, while the second pixel element is energized 180° out of phase with respect to the first pixel element. Based on the relative amount of charge accumulated on the first and second pixel elements, the phase angle of the reflected light pulse received in the imaging pixel array is computed versus the probe modulation. From that phase angle, the distance out to the corresponding locus may be assessed.

While the above description emphasizes one type of time-of-flight depth imaging, the nature of depth cameras may differ in the various embodiments of this disclosure. In some embodiments, brightness or color data from two stereoscopically oriented imaging pixel arrays in a depth camera may be co-registered and used to construct a depth map. In some embodiments, a depth camera may be configured to project onto the subject a structured infrared illumination pattern comprising numerous discrete features—e.g., lines or dots. An imaging pixel array in the depth camera may be configured to image the structured illumination reflected back from the subject. Based on the spacings between adjacent features in the various regions of the imaged subject, a depth map of the subject may be constructed. In some embodiments, therefore, the modulated light source may be a spatially—rather than temporally—modulated light source. There, the imaging pixel array indicates distance to each locus by revealing the separation between adjacent illuminated areas of the subject.

Returning to FIG. 6, when included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Figure 8:
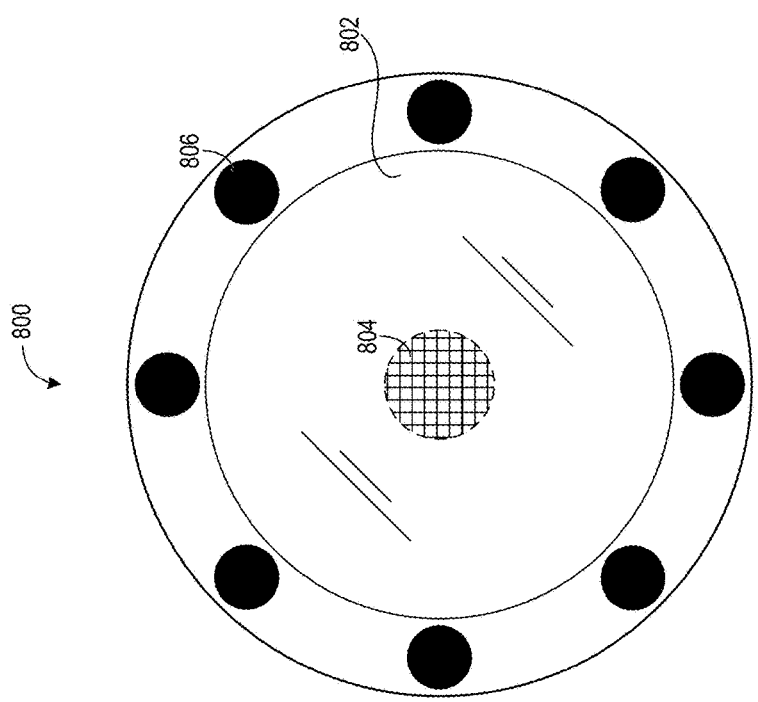
FIG. 8 shows an example IR camera.

FIG. 8 shows an example infrared (IR) camera 800 operable to capture IR images of a scene. Camera 800 may be used to obtain IR images of a human subject, for example, and may enable at least a portion of the approaches described herein for identifying color in a VL image and/or adjusting the VL image based on IR skin response.

In the example depicted in FIG. 8, camera 800 includes an IR band pass filter 802 configured to transmit at least a portion of impinging IR light to an image sensor 804 positioned optically downstream the filter. Image sensor 804 is photoelectrically sensitive to at least a range of IR wavelengths, enabling transduction of IR light received thereon. Image sensor 804 may incorporate various suitable image sensing technologies, including a charge-coupled device (CCD) and/or a complementary metal-oxide-semiconductor (CMOS) sensor, for example. Camera 800 further includes an IR illuminant configured to project (e.g., diffuse) IR light into a scene to enable the reception of reflected IR light from the scene. In this example, the IR illuminant includes eight IR LEDs (e.g., IR LED 806) positioned in an annular arrangement concentrically around filter 802. It will be appreciated, however, that this arrangement is non-limiting and that various suitable configurations may be employed for projecting IR light into a scene, including arrangements in which the IR illuminant is provided in a housing separate from that of camera 800. In some examples, the IR illuminant may be pulsed to reduce adverse effects of ambient light on image sensing.

In some examples, camera 800 may be constructed as an IR camera. In other examples, camera 800 may be manufactured as a VL camera and converted to an IR camera. In this example, the conversion process may include removing an IR cut filter (if included), adding IR band pass filter 802, and adding the IR illuminant. In some scenarios, the conversion process may include replacing an image sensor if its sensitivity is unsuitable for sensing IR light.

In some implementations, camera 800 is a two-dimensional, monocular IR camera configured to generate IR images having a plurality of IR pixels each specifying one or more IR parameters such as an IR intensity. Camera 800 may be used to generate IR image 302 of FIG. 3, for example. In this case, IR images generated by camera 800 may be fed to a suitable computing device (not shown in FIG. 8) configured to determine the depth of each IR pixel based on the IR intensity specified by that pixel, utilizing knowledge of IR reflection phenomena. The computing device may have a suitable IR camera interface (e.g., interface 612 of FIG. 6) for receiving a signal encoding an IR image, for example. Specifically, the computing device may utilize the inverse-square falloff of light to compute depth based on IR intensity; a function that maps the inverse square of IR intensity to depth may be used, for example. Thus, a relatively lower IR intensity may be mapped to a relatively greater depth, while a relatively greater IR intensity may be mapped to a relatively lesser depth. Use of a two-dimensional IR camera in this manner may facilitate depth determination at low cost and power consumption, especially relative to use of a three-dimensional depth camera.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

An example provides an image processing method comprising receiving from an infrared camera a signal encoding an infrared (IR) image including a plurality of IR pixels, each IR pixel specifying one or more IR parameters of that IR pixel, identifying, in the IR image, IR-skin pixels that image human skin, identifying a skin tone of identified human skin based at least in part on the IR-skin pixels, the skin tone having one or more expected visible light (VL) parameters, receiving from a VL camera a signal encoding a VL image including a plurality of VL pixels, each VL pixel specifying one or more VL parameters of that VL pixel, identifying, in the VL image, VL-skin pixels that image identified human skin, and adjusting the VL image to increase a correspondence between the one or more VL parameters of the VL-skin pixels and the one or more expected VL parameters of the identified skin tone. In such an example, the one or more IR parameters may alternatively or additionally include an IR intensity. In such an example, an IR-skin pixel is alternatively or additionally identified as imaging human skin based on the IR intensity of that skin pixel being within a predetermined range of IR intensities. In such an example, the skin tone may alternatively or additionally be identified based on the IR intensities of one or more IR-skin pixels being within a corresponding one of a plurality of subranges within a predetermined range of IR intensities. In such an example, identifying the IR-skin pixels may alternatively or additionally include analyzing the IR image for geometric features that correspond to human body shapes. In such an example, identifying the VL-skin pixels may alternatively or additionally include selecting VL-skin pixels of the plurality of VL pixels that are registered to the identified IR-skin pixels. In such an example, the one or more expected VL parameters may alternatively or additionally specify an expected skin color under neutral lighting conditions. In such an example, the VL image is alternatively or additionally adjusted so that a color value of each VL-skin pixel substantially matches the expected skin color. In such an example, the method may alternatively or additionally include identifying a color of one or more non-VL-skin pixels in the adjusted VL image. In such an example, the non-VL-skin pixels may alternatively or additionally image human hair. In such an example, adjusting the VL image may alternatively or additionally include adjusting a brightness of the plurality of VL pixels via an S-curve.

Another example provides an image processing method comprising receiving an infrared (IR) image including a plurality of IR pixels, each IR pixel specifying one or more IR parameters of that IR pixel, identifying, in the IR image, IR-skin pixels that image human skin, identifying a skin tone of identified human skin based at least in part on the IR-skin pixels, the skin tone having an expected visible light (VL) brightness for one or more light channels, receiving a VL image including a plurality of VL pixels, each VL pixel specifying a brightness of that VL pixel for the one or more light channels, identifying, in the VL image, VL-skin pixels that image identified human skin, and adjusting the VL image to increase a correspondence between the brightness of the VL-skin pixels and the expected VL brightness of the identified skin tone for the one or more light channels. In such an example, the one or more IR parameters alternatively or additionally includes an IR intensity. In such an example, an IR-skin pixel may alternatively or additionally be identified as imaging human skin based on the IR intensity of that skin pixel being within a predetermined range of IR intensities. In such an example, the skin tone may alternatively or additionally be identified based on the IR intensities of one or more IR-skin pixels being within a corresponding one of a plurality of subranges within a predetermined range of IR intensities. In such an example, identifying the VL-skin pixels may alternatively or additionally include selecting VL-skin pixels of the plurality of VL pixels that are registered to the identified IR-skin pixels. In such an example, the skin tone may alternatively or additionally have a respective expected VL brightness for a red channel, a blue channel, and a green channel. In such an example, each VL pixel may alternatively or additionally specify a respective brightness of that VL pixel for the red channel, the blue channel, and the green channel. In such an example, the VL image may alternatively or additionally be adjusted to increase respective correspondences between the red channel brightness, the blue channel brightness, and the green channel brightness of the VL-skin pixels, and the expected red channel brightness, the expected blue channel brightness, and the green channel brightness of the identified skin tone. In such an example, the method may alternatively or additionally comprise identifying a brightness of one or more non-VL-skin pixels in the adjusted VL image for the one or more light channels.

Another example provides a computing device comprising an infrared (IR) camera interface configured to receive from an IR camera an infrared (IR) image including a plurality of IR pixels, each IR pixel specifying one or more IR parameters of that IR pixel, a visible light (VL) camera interface configured to receive from a VL camera a VL image including a plurality of VL pixels, each VL pixel specifying one or more VL parameters of that VL pixel, a logic machine, and a storage machine holding instructions executable by the logic machine to identify, in the IR image, IR-skin pixels that image human skin, identify a skin tone of identified human skin based at least in part on the IR-skin pixels, the skin tone having one or more expected visible light (VL) parameters, identify, in the VL image, VL-skin pixels that image identified human skin, and adjust the VL image to increase a correspondence between the one or more VL parameters of the VL-skin pixels and the one or more expected VL parameters of the identified skin tone. In such an example, the one or more IR parameters may alternatively or additionally include an IR intensity. In such an example, an IR-skin pixel may alternatively or additionally be identified as imaging human skin based on the IR intensity of that skin pixel being within a predetermined range of IR intensities. In such an example, the skin tone may alternatively or additionally be identified based on the IR intensities of one or more IR-skin pixels being within a corresponding one of a plurality of subranges within a predetermined range of IR intensities. In such an example, identifying the VL-skin pixels may alternatively or additionally include selecting VL-skin pixels of the plurality of VL pixels that are registered to the identified IR-skin pixels.

The invention claimed is:

1. An image processing method, comprising:
    receiving from an infrared camera a signal encoding an infrared (IR) image including a plurality of IR pixels, each IR pixel specifying one or more IR parameters of that IR pixel;
    identifying, in the IR image, IR-skin pixels that image human skin, the one or more IR parameters including an IR intensity;
    determining which skin tone of a plurality of skin tones corresponds to the human skin by mapping the IR intensity of each IR-skin pixel to a corresponding IR intensity subrange of a plurality of IR intensity subranges each predetermined to correspond to one of the plurality of skin tones, each of the plurality of skin tones predetermined to have one or more expected visible light (VL) parameters;
    receiving from a VL camera a signal encoding a VL image including a plurality of VL pixels, each VL pixel specifying one or more VL parameters of that VL pixel;
    identifying, in the VL image, VL-skin pixels that image identified human skin; and
    adjusting the VL image to increase a correspondence between the one or more VL parameters of the VL-skin pixels and the one or more expected VL parameters of the skin tone.

2. The method of claim 1, wherein an IR-skin pixel is identified as imaging human skin based on the IR intensity of that IR-skin pixel being within the plurality of IR intensity subranges.

3. The method of claim 1, wherein identifying the IR-skin pixels further includes analyzing the IR image for geometric features that correspond to human body shapes.

4. The method of claim 1, wherein identifying the VL-skin pixels includes selecting VL-skin pixels of the plurality of VL pixels that are registered to the identified IR-skin pixels.

5. The method of claim 1, wherein the one or more expected VL parameters specify an expected skin color under neutral lighting conditions.

6. The method of claim 5, wherein the VL image is adjusted so that a color value of each VL-skin pixel more closely matches the expected skin color.

7. The method of claim 1, further comprising identifying a color of one or more non-VL-skin pixels in the adjusted VL image.

8. The method of claim 7, wherein the non-VL-skin pixels image human hair.

9. The method of claim 1, wherein adjusting the VL image includes adjusting a brightness of the plurality of VL pixels via an S-curve.

10. An image processing method, comprising:
    receiving an infrared (IR) image including a plurality of IR pixels, each IR pixel specifying one or more IR parameters of that IR pixel;
    identifying, in the IR image, IR-skin pixels that image human skin, the one or more IR parameters including an IR intensity;
    determining which skin tone of a plurality of skin tones corresponds to the human skin by mapping the IR intensity of each IR-skin pixel to a corresponding IR intensity subrange of a plurality of IR intensity subranges each predetermined to correspond to one of the plurality of skin tones, each of the plurality of skin tones predetermined to have an expected visible light (VL) brightness for one or more light channels;
    receiving a VL image including a plurality of VL pixels, each VL pixel specifying a brightness of that VL pixel for the one or more light channels;
    identifying, in the VL image, VL-skin pixels that image identified human skin; and
    adjusting the VL image to increase a correspondence between the brightness of the VL-skin pixels and the expected VL brightness of the skin tone for the one or more light channels.

11. The method of claim 10, wherein an IR-skin pixel is identified as imaging human skin based on the IR intensity of that IR-skin pixel being within the plurality of IR intensity subranges.

12. The method of claim 10, wherein identifying the VL-skin pixels includes selecting VL-skin pixels of the plurality of VL pixels that are registered to the identified IR-skin pixels.

13. The method of claim 10, wherein the skin tone has a respective expected VL brightness for a red light channel, a blue light channel, and a green light channel,
    wherein each VL pixel specifies a respective brightness of that VL pixel for the red light channel, the blue light channel, and the green light channel, and
    wherein the VL image is adjusted to increase respective correspondences between the red light channel brightness, the blue light channel brightness, and the green light channel brightness of the VL-skin pixels, and the expected red light channel brightness, the expected blue light channel brightness, and the expected green light channel brightness of the skin tone.

14. The method of claim 10, further comprising identifying a brightness of one or more non-VL-skin pixels in the adjusted VL image for the one or more light channels.

15. A computing device, comprising:
an infrared (IR) camera interface configured to receive from an IR camera an infrared (IR) image including a plurality of IR pixels, each IR pixel specifying one or more IR parameters of that IR pixel including an IR intensity of that IR pixel;
a visible light (VL) camera interface configured to receive from a VL camera a VL image including a plurality of VL pixels, each VL pixel specifying one or more VL parameters of that VL pixel;
a logic machine; and
a storage machine holding instructions executable by the logic machine to:
  identify, in the IR image, IR-skin pixels that image human skin;
  determine which skin tone of a plurality of skin tones corresponds to the human skin by mapping the IR intensity of each IR-skin pixel to a corresponding IR intensity subrange of a plurality of IR intensity subranges each predetermined to correspond to one of the plurality of skin tones, each of the plurality of skin tones predetermined to have one or more expected visible light (VL) parameters;
  identify, in the VL image, VL-skin pixels that image identified human skin; and
  adjust the VL image to increase a correspondence between the one or more VL parameters of the VL-skin pixels and the one or more expected VL parameters of the identified skin tone.

16. The computing device of claim 15, wherein an IR-skin pixel is identified as imaging human skin based on the IR intensity of that IR-skin pixel being within the plurality of IR intensity subranges.

17. The computing device of claim 15, wherein identifying the VL-skin pixels includes selecting VL-skin pixels of the plurality of VL pixels that are registered to the identified IR-skin pixels.

* * * * *